Oct. 22, 1935.  H. W. BIRK  2,018,117

SOLDERING MEANS

Filed May 19, 1934

INVENTOR
Harold W. Birk
by Harry R. Williams
atty.

Patented Oct. 22, 1935

2,018,117

UNITED STATES PATENT OFFICE 2,018,117

SOLDERING MEANS

Harold W. Birk, East Hartford, Conn., assignor of fifty per cent to Ralpha M. Birk, East Hartford, Conn., and fifty per cent to Ufa E. Guthrie, Hartford, Conn.

Application May 19, 1934, Serial No. 726,468

4 Claims. (Cl. 113—110)

This invention relates to means for securing joints between wires, plates and other metal pieces by fused metallic alloys.

The object of the invention is to provide an inexpensive, ready for use, efficient means whereby anyone may secure joints between metallic pieces, especially electrical splices, neatly and firmly without the aid of any tools or implements for applying the fusible metal to the parts to be united and for fusing the metal to complete the joint, which means is so devised that it will not readily deteriorate as a result of atmospheric conditions or chemical action between the elements.

This means comprises a quantity of solder and flux associated with a quantity of easily ignited highly inflammable heat producing compound, made in the form of a plastic, pliable or flexible tape, sheet, or split tube, of convenient size that can be laid on, or wrapped around, or folded about, the joint to be secured with the solder innermost, so that when the compound is ignited sufficient heat will be generated to render the flux active and so fuse the solder that it will fill the interstices of and mechanically complete the joint, there being an infusible metallic foil or foil that has a much higher fusing point than the solder between the combustible material and the solder which, while readily conducting heat from the ignited combustible material to the solder, will shield the solder and flux from any oxidizing effect of the combustible material when static and from deterioration when active, will retain the fluid solder about the joint, and will not adhere to the metal parts which are united by the solder.

In the accompanying drawing Fig. 1 shows a twisted wire joint before being soldered.

Figure 1:
Figure 2:
Fig. 2 shows the same with a soldering means which embodies this invention applied to the joint.
Figure 3:
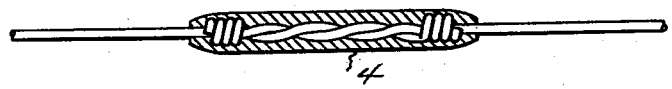
Fig. 3 is a diagrammatic view of the soldered joint.
Figure 4:
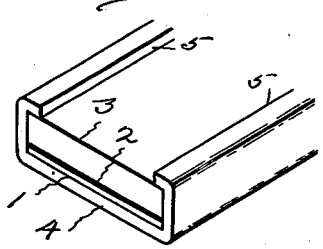

Fig. 4 on greatly enlarged scale as to thickness of the elements, shows a strip of soldering means made according to one development of this invention.

Figure 5:
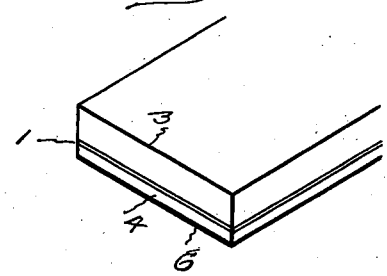

Fig. 5 shows a modified construction of the means.

Figure 6:
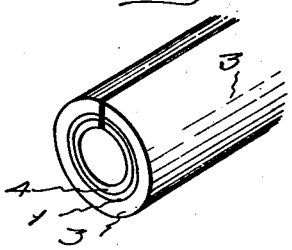

Fig. 6 shows a means in tubular form.

An embodiment of the invention may be constructed in the following manner. A sheet of foil 1, aluminum or similar metal that will conduct heat from the inflammable or heat producing compound to the solder but will not melt under the heat developed, or adhere to the solder, is cut to the desired size and shape and coated with a rubber or an equivalent flexible cement 2. A quantity, depending upon the area of the joint to be soldered, of easily ignitable heat producing compound 3, preferably potassium-chloride and charcoal, with or without sugar, wet with latex and mixed to a pasty constituency, or other well known compound which when ignited will generate a sufficient degree of heat to melt the solder but not the foil, is spread upon the cemented surface of the foil and sprayed with acetic acid. This when dried is cut into sheets or strips of the desired size, and sheets of solder 4, composed of the usual lead-tin elements or other common constituents, is applied to the surface of a foil not covered with combustible compound and the edges 5 of the solder folded over so as to hold the elements together. Instead of folding over the edges of the solder for holding the elements together, cement may be employed if desired. The solder may be granular and mixed with a flux, rosin or any of the well known substances used for such purposes, as the case of the construction illustrated in Fig. 4, or the solder may be in an integral sheet and have a coating 6 of flux on its outer surface as indicated in Fig. 5.

This soldering element may be rolled or otherwise packaged for transportation. It comprises all the elements necessary for soldering arranged in correct sequence to be folded or wrapped about the sections of metal to be secured together. It is convenient to use, the only accessory necessary is a match or other means for igniting the heat generating compound which readily flares and not being affected by drafts or wind permits the soldering to be done out of doors as well as in. The combustible element may be so composed as to burn or flare fast or slow, and it may be varied in quantity or composition according to the nature of the work to be done. To solder a connection it is only necessary to clasp, wrap or otherwise cover the parts to be joined with the solder layer inmost and then ignite the heat producing compound on the outside. The foil shield protects the solder from oxidation or from other deleterious action of the combustible compound. It readily conducts heat from the burning compound to the solder first liquefying the flux and then melting the solder, and it also retains the liquefied solder about the joint until it has solidified. The foil shield prevents radiation of heat from the molten solder, so that the parts being joined are heated, which parts, of course, have been properly connected and cleaned before the soldering means is applied. When the heating compound has been consumed and the work is sufficiently cooled, the protecting shield is removed and any refuse wiped off from the completed joint.

With this means the terminals of electrical conductors can be soldered without the use of any accessory equipment. The means is merely applied and ignited and the soldering is accomplished quickly making a clean noncorroded joint that has high electrical conductivity and mechanical strength.

The invention claimed is:

1. A soldering strip for securing metal joints comprising a sheet of high fusing metal, a layer of low fusing soldering material on one side thereof, and a layer of readily ignitible inflammable material on the opposite side thereof, said strip being pliable whereby it may be bent to properly conform to the joint to which it is to be applied.

2. A soldering strip for securing metal joints comprising a layer of low fusing soldering material, a layer of readily ignitible inflammable material, and a sheet of high fusing heat conducting metal disposed between said layers whereby to prevent the inflammable material from contacting with the soldering material but to permit heat to be conducted thereto, said strip being pliable whereby it may be bent to properly conform to the joint to which it is to be applied.

3. A soldering strip for securing metal joints comprising a sheet of high fusing metal, a layer of low fusing soldering material and flux on one side thereof, and a layer of readily ignitible inflammable material on the opposite side thereof, said strip being pliable whereby it may be bent to properly conform to the joint to which it is to be applied.

4. A unitary soldering strip for securing metal joints comprising a sheet of high fusing heat conducting metal, a layer of readily ignitible inflammable material on one side thereof, a layer of low fusing soldering material on the opposite side thereof having its edges bent to enclose the sides of said strip, said strip being pliable whereby it may be bent properly to conform to the joint to which it is to be applied.

HAROLD W. BIRK.